Aug. 2, 1932.  C. MORROW  1,869,706
LIQUID TREATING APPARATUS
Filed Oct. 2, 1930  4 Sheets-Sheet 1

INVENTOR
Clifford Morrow
By Geo. B. Pitts
ATTORNEY.

Aug. 2, 1932.  C. MORROW  1,869,706
LIQUID TREATING APPARATUS
Filed Oct. 2, 1930   4 Sheets-Sheet 2

INVENTOR
Clifford Morrow
By
Jas. B. Pitts
ATTORNEY

Aug. 2, 1932.   C. MORROW   1,869,706
LIQUID TREATING APPARATUS
Filed Oct. 2, 1930   4 Sheets-Sheet 3

INVENTOR
Clifford Morrow
By Geo. B. Pitts
ATTORNEY

Aug. 2, 1932.    C. MORROW    1,869,706
LIQUID TREATING APPARATUS
Filed Oct. 2, 1930    4 Sheets-Sheet 4
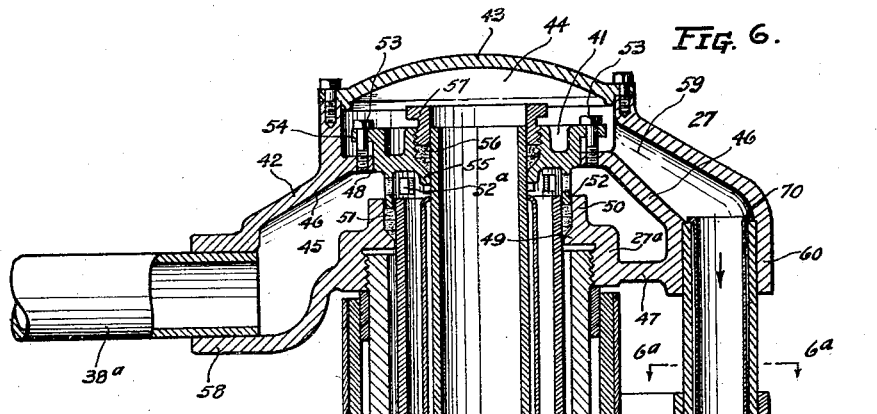
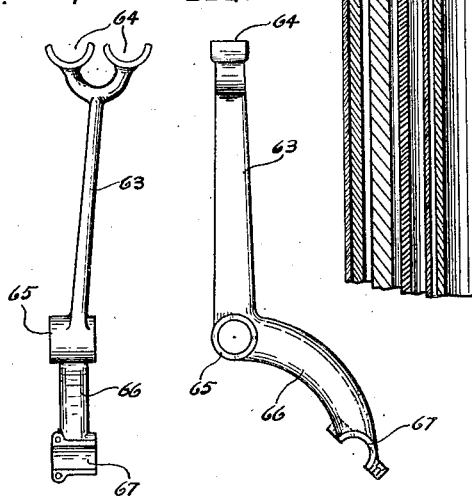
INVENTOR
Clifford Morrow
BY
Jno. B. Pitts
ATTORNEY Patented Aug. 2, 1932

1,869,706

UNITED STATES PATENT OFFICE

CLIFFORD MORROW, OF CANTON, OHIO, ASSIGNOR TO THE H. H. MILLER INDUSTRIES COMPANY, OF CANTON, OHIO, A CORPORATION OF OHIO

LIQUID TREATING APPARATUS

Application filed October 2, 1930. Serial No. 486,035.

This invention relates to an apparatus for storing or treating milk.

One object of the invention is to provide an improved apparatus for storing milk or subjecting it to a heat transfer medium in an economical manner.

Another object of the invention is to provide in apparatus of this character having a circulation coil, improved means for the supplying of a heat transfer medium to the coil without danger of unduly affecting the milk.

Another object of the invention is to provide an improved distributing means for the heat transfer medium.

A further object of the invention is to construct in a milk treating apparatus having a circulation coil for a heating transfer medium, an under drive mechanism for revolving the coil and inlet and outlet connections for supplying the medium to the coil and discharging it therefrom.

Other objects of the invention will be apparent to those skilled in the art to which my invention relates from the following description taken in connection with the accompanying drawings, wherein Fig. 1 is a plan view of an apparatus embodying my invention, partly in section on the line 1—1 of Fig. 2.

Fig. 6 is a fragmentary section enlarged, on the line 6—6 of Fig. 1.

Figs. 7 and 8 are plan and end views of the supporting brackets for the coils.

Figure 1:
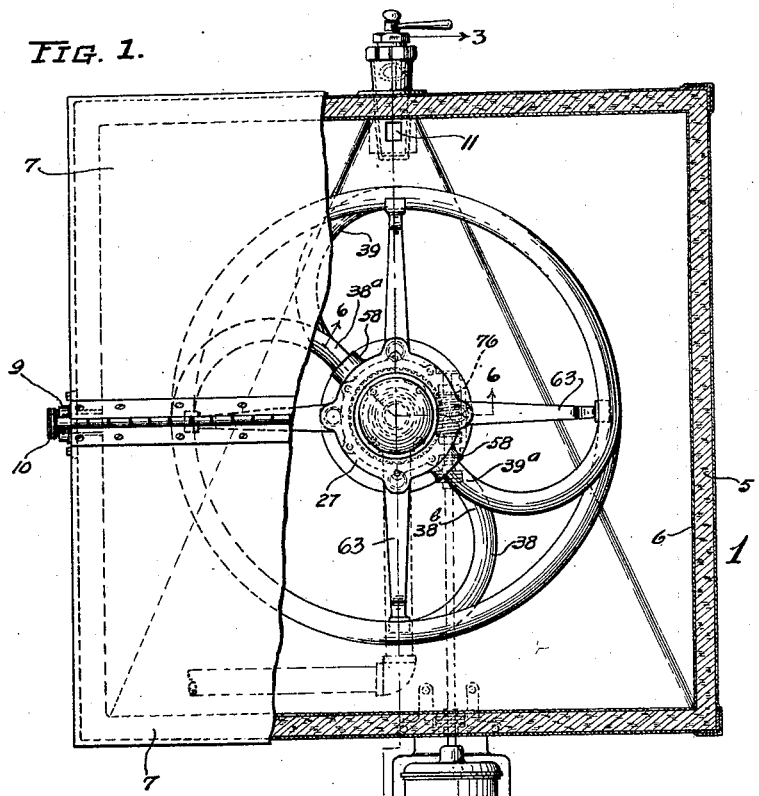
Figure 2:
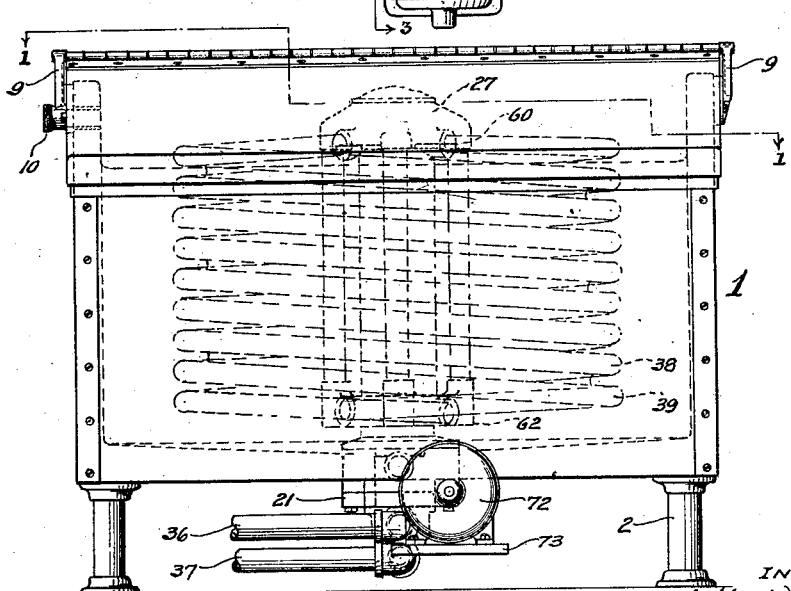
Fig. 2 is a side elevation of the apparatus.

In the drawings, 1 indicates as an entirety a tank or holder for milk, cream or other liquid to be treated. The tank 1 is preferably supported on suitable legs 2, and it is shown as of polygonal shape in cross section. The bottom of the tank comprises a base 2 formed with a central opening 3. Surrounding the opening 3, the base 2 is provided with a ring or collar 4 to which reference will later be made. The side walls of the tank may be constructed in any desired manner, but both the bottom and side wall include a suitable insulation 5 and are lined with suitable sheet metal 6 (which is of a character that is not affected by the liquid) to make the tank liquid tight. Two opposite sides of the tank are inclined along their upper edges from their ends upwardly and support lids 7 hinged on a rod 8. The rod 8 is supported by brackets 9 on the outer faces of the said side walls.

The tank is provided with an inlet or supply pipe 10, preferably leading through one side wall. The discharge of the liquid from the tank is through an opening 11 formed in the bottom, this opening being controlled by a valve, indicated as an entirety at 12. No claim is made herein to the valve and its relation to the tank, since the same forms the subject-matter of my co-pending application filed June 14, 1930, Ser. No. 421,661. The bottom has oppositely inclined portions to insure drainage through the opening 11.

13 indicates a tubular member disposed centrally in the tank 1, being threaded at its lower end into a collar 14 having a flange 15 engaging the bottom around the opening 3. 16 indicates an annular bearing member having a rabbeted portion 17, into which the collar 14 fits, and a stepped lower surface resting on the ring 4. The body portion 18 of the annular member forms a bearing for the inset portion 19 of the hub of a worm gear 20. 21 indicates an annular casing comprising a ring 22 and a member 23 having an outer flange 23a and an inner flange 23b. The outer flange 23a engages the ring 22. 24 indicates screws passing through the flange 23a, ring 22, ring 4 and flange 15 to secure these parts rigidly together, whereby the tubular member 13 is supported firmly in upright position on the tank bottom. The inner flange 23b engages the lower shoulder formed by the inset 19 to support the worm gear 20 and to maintain its upper shoulder, which is formed by the inset 19, against the lower end of the body portion 18, the outer wall of the flange 23b forming a bearing for the gear. The inset portion 19 of the gear is keyed or otherwise connected, as shown at 25, to a hollow shaft 26, which has bearing near its upper end upon the inner wall of the tubular member 13 and rotates therein. The hollow shaft 26 extends beyond the upper end of the tubular member 13 and has secured to it a head indicated as an entirety at 27. The head 27 has an inner annular wall 27a which is threaded on the upper end of the hollow shaft 26 and is rotated thereby. The tubular member 13 is covered or surfaced with a suitable metal 13a that is not attacked by the liquid being threaded.

28 indicates a fitting having an intermediate wall 29 forming upper and lower chambers 30, 31. The upper open end of the fitting is provided on its outer side with a plurality of lugs 32 which are secured rigidly to the casing 21 by suitable cap screws threaded into the latter, to support the fitting in position with its upper open end concentric to the tubular member 13. 33, 34, indicate circulation pipes arranged one within the other and extending through the hollow shaft 26, the outer pipe 34 being threaded at its lower end into the upper open end of the fitting 28 and communicating with the chamber 30 and the inner pipe 33 being threaded at its lower end into an opening 35 formed in the intermediate wall 29 and communicating with the chamber 31. One side of the fitting is formed above and below the wall 29 with openings 30a, 31a, which provide connections for supply and discharge pipes 36, 37, respectively, for the heat transfer medium, such as hot water or brine or other refrigerant. The pipes 33, 34, have substantial different diameters, so that ample flow of the medium takes place in the annular space surrounding the inner pipe 33. As indicated by the arrows (Fig. 3), the heat transfer medium is supplied by the pipe 37 to the chamber 31 and pipe 33 after circulating through coils 38, 39, which will be later referred to, the medium flows down through the pipe 34 to the chamber 30 and escapes through the discharge pipe 36.

40 indicates a jacket surrounding the pipe 33 in spaced relation thereto and extending throughout the length thereof between the wall 29 and a bearing member 41 which rotatably engages the upper end of the pipe. The jacket 40 being spaced from the outer wall of the pipe 33 forms therearound a dead air space which is utilized as an insulating means to prevent transfer of heat units between the medium flowing up the pipe 33 and down the pipe 34, whereby the apparatus may be operated economically. The ends of the jackets are suitably secured to the pipe 33 to prevent leakage of the medium into the dead air space.

The head 27 comprises an inner member 41 (to wit, the bearing member already referred to), an outer member 42, and a removable cap 43 which are related to provide a distributing chamber 44, with which the upper end of the pipe 33 communicates and an annular return chamber 45, which is connected with the pipe 34 as will later appear. The outer member 42 consists of the inner wall 27a (already referred to) and an outer wall 46 connected at their lower portions by a bottom wall 47. The outer wall 46 is provided with a flange 48 into which the member 41 is removably seated. The inner wall 27a is provided with a flange 49, which rotatably engages the pipe 34 above tubular member 13, and an upwardly extending collar 50, the latter being spaced from the pipe 34 to receive a packing 51; whereas the inner member 41 is provided with a depending skirt 52, which extends into the space formed by the collar 50, the skirt being pressed into the packing 51 by bolts 53 extending through a flange 54 on the member 41 and threaded into the flange 48, whereby a gland results to prevent leakage exteriorly of the pipe 34. The skirt 52 is formed without its circumference above the collar 50 with a plurality of openings 52a, through which the heat transfer medium flows from the chamber 45 to the upper open end of the pipe 34. The inner portion of the member 41 is provided with a downwardly inclined wall 55 rotatably fitting the upper end portion of the pipe 33 and forming a space for packing 56. A collar 57 is threaded into the open end of the member 41 and engages the packing 56 to form a gland to prevent leakage of the medium between the pipes 33, 34, or between the chambers 44, 45.

At diametrically opposite sides of the head 27, the walls 27a, 46, 47, are shaped to provide nipples 58 to which are connected the discharge ends 38a, 39a, of the coils 38, 39.

At uniformly spaced points around the head outer member 42, the wall 46 thereof is shaped to provide a plurality of conduits 59 (preferably four conduits disposed 90° apart) extending from the distributing chamber 44 and terminating in nipples 60 into each of which is suitably fitted and rigidly secured the upper end of a circulation pipe 61. The pipes 61 extend downwardly in spaced relation to the tubular member 13 and are connected at their lower ends in a well known manner to a manifold 62. At diametrical opposite points the manifold 62 is provided with nipples 62a to which the inlet ends 38b, 39b, of the coils 38, 39, are respectively connected.

The convolutions of the coils 38, 39, are preferably arranged in alternate relation from top to bottom and are carried by brackets 63, which are supported by the pipes 61 and extend therefrom radially of the axis of the tubular member 13. I may provide a plurality of brackets on each pipe 61. The outer end of each bracket is bifurcated and provided with two substantially semi-circular pads 64 which engage two adjacent convolutions. The inner end of each bracket is provided with a collar 65 which rotatably fits the adjacent pipe 61, and a tail 66 terminating in a clamping element 67 which is secured to the adjoining pipe 61 by a clamping element 68.

Figure 3:
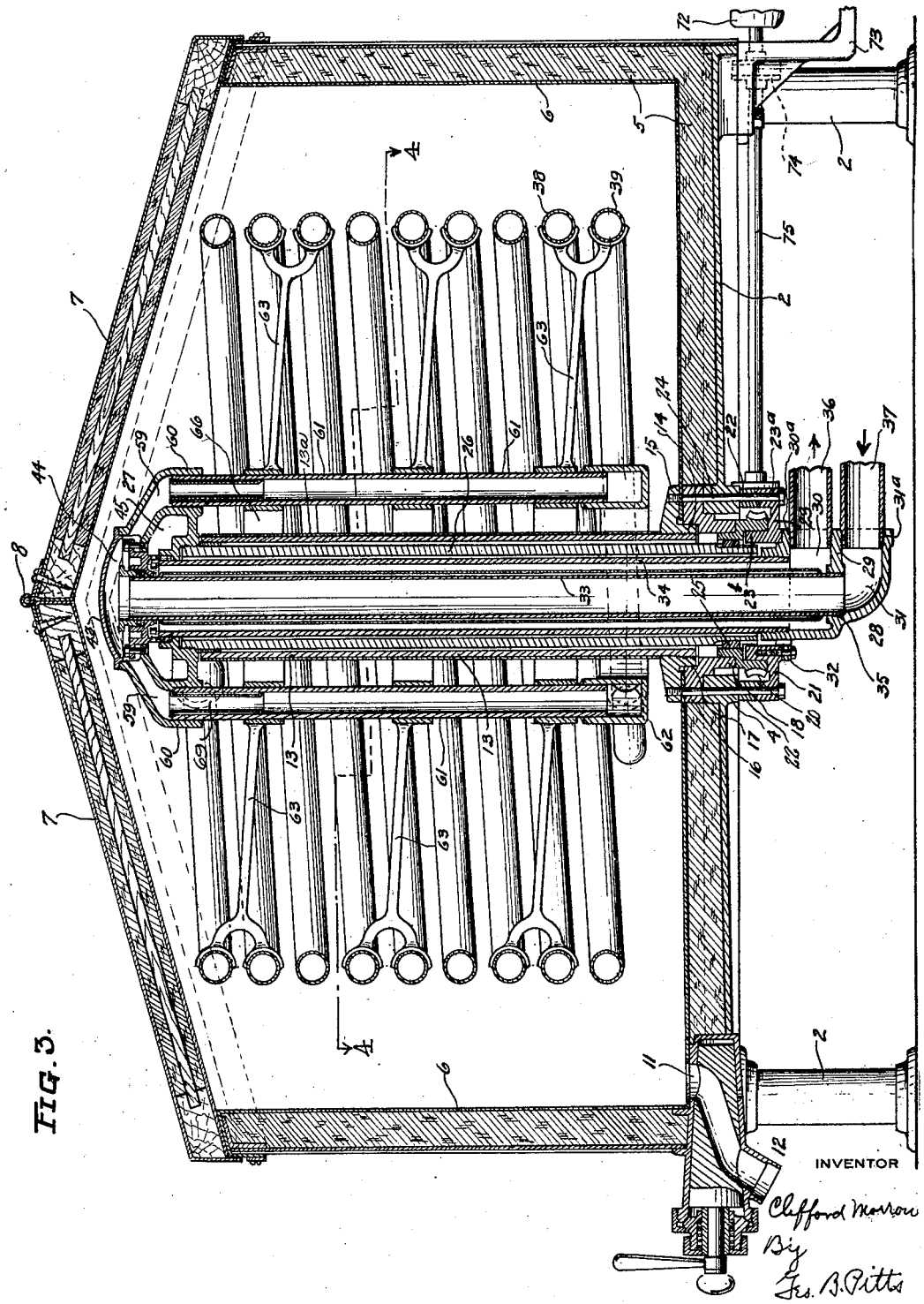
Fig. 3 is a section on the line 3—3 of Fig. 1.
Figure 4:
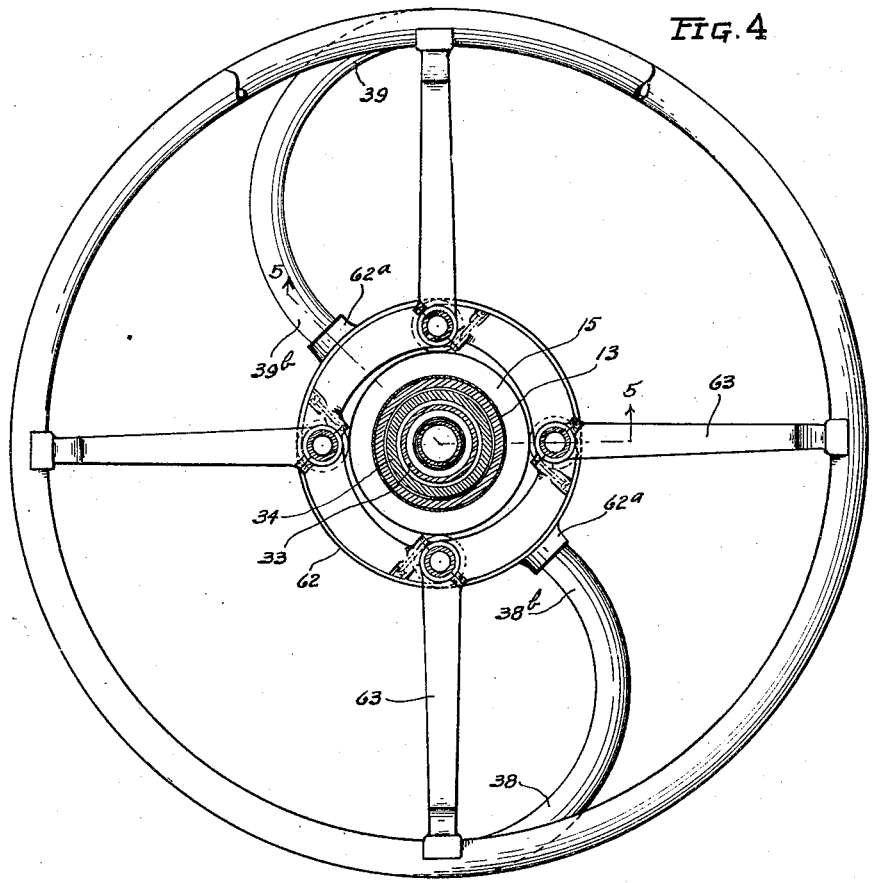
Fig. 4 is a section on the line 4—4 of Fig. 3.
Figure 5:
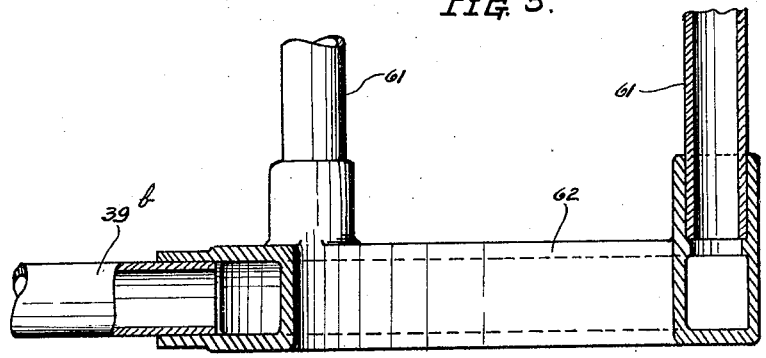
Fig. 5 is a fragmentary view of the supply pipes and supply member on the line 5—5 of Fig. 4.

69 indicates a sleeve extending from the upper end of each pipe 61 downwardly for any desired distance, but to a distance below the level of the liquid in the tank 1. As shown in Figs. 3 and 6, the sleeve 69 is smaller in diameter than the pipe 61 so as to form an annular space between them, this space being closed (a) at its upper end by a flange 70 on the upper end of the sleeve and fitting over the end of the pipe and (b) at its lower end by the outwardly flared lower end 71 of the sleeve, which end is suitably sweated to the interior wall of the pipe. This form of construction results in forming a dead air space from a point above the liquid level to a point below such level, so that where hot water constitutes the heat transfer medium, danger of cooking or overheating that portion of the liquid which constitutes its surface is avoided.

72 indicates an electric motor suitably supported by a bracket 73 fixed to the base 2. The motor shaft is connected through a coupling 74 to a drive shaft 75 which extends into and has bearing in the walls of the casing 21; and within the casing the shaft 75 is provided with a worm 76 (Fig. 1), which meshes with the worm gear to drive the hollow shaft 26 and through the latter, to rotate the head 27, pipes 61, manifold 62 and coils 38, 39, as a unit. The rotation of these parts stirs the liquid sufficiently to cause a substantially uniform heating or cooling of the liquid in the tank. By mounting these parts in a polygonal tank, the side walls thereof serve to break up tendency of the liquid to move bodily with these rotating parts so that more efficient stirring results.

In the preferred operation, the heat transfer medium flows into the chamber 31, through the pipe 33, chamber 44, conduits 59, pipes 61, manifold 62, coils 38, 39, to the chamber 45 and is discharged through the pipe 34, chamber 30 and pipe 36; but such medium may be caused to flow in the opposite direction.

Where milk or cream is to be stored, a refrigerant of the desired temperature may be supplied to and circulated through the coils 38, 39, and when desired, these coils may be rotated at a reduced speed to maintain slight stirring of the liquid.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a liquid treating apparatus, the combination of a tank formed with an opening in its bottom, a tubular member within said tank and stationarily supported at its lower end on said bottom, concentric to said opening, a hollow shaft extending through said member and rotatably mounted on its inner wall at its upper end, means connected to the lower end of said shaft below said bottom for rotating it, a head secured to the upper end of said shaft and rotated thereby, a fitting disposed below and connected to said bottom, a pipe connected to said fitting and extending through said hollow shaft for supplying a heat transfer medium to the interior of said head, a coil in said tank connected at one end to said head to permit flow of the medium into and through said coil and at its opposite end to said head to permit the discharge of the medium from said coil, and a conduit extending through said shaft for discharging the medium from said coil.

2. In a liquid treating apparatus, the combination of a tank formed with an opening in its bottom, a tubular member within said tank and stationarily supported at its lower end on said bottom, concentric to said opening, a hollow shaft extending through said member and rotatably mounted on its inner wall at its upper end, means connected to the lower end of said shaft below said bottom for rotating it, a head secured to the upper end of said shaft and rotated thereby, a fitting disposed below and connected to said bottom and having supply and discharge connections for a heat transfer medium, pipes connected respectively to said connections and extending through said hollow shaft, one of said pipes serving to supply the medium to the interior of said head, a coil connected at one end to said head to permit flow of the medium into and through said coil, and connections between the opposite end of said coil and said pipe for discharging the medium into the latter.

3. In a liquid treating apparatus, the combination of a tank formed with an opening in its bottom, a tubular member within said tank and stationarily supported at its lower end on said bottom, concentric to said opening, a hollow shaft extending through said member and rotatably mounted on its inner wall at its upper end, means connected to the lower end of said shaft below said bottom for rotating it, a hollow head secured to the upper end of said shaft and rotated thereby, said head comprising related sections forming a distributing chamber and a return chamber, a fitting disposed below and connected to said bottom and comprising upper and lower chambers, inner and outer pipes extending through said hollow shaft, the outer pipe communicating at its lower end with said upper chamber and communicating at its upper end with said return chamber and said inner pipe communicating at its lower end with said lower chamber and communicating at its upper end with said distributing chamber, a coil within said tank, connections between one end of said coil and said distributing chamber, and connections between the other end of said coil and said return chamber.

4. In a liquid treating apparatus, the combination of a tank formed with an opening in its bottom, a tubular member supported on said bottom, concentric to said opening, a hollow shaft rotatably mounted in said tubular member, means connected to the lower end of said shaft below said bottom for rotating it, a hollow head carried by the upper end of said shaft and rotated thereby, said head comprising related sections forming a distributing chamber and a return chamber, a fitting disposed below and connected to said bottom and comprising upper and lower chambers, inner and outer pipes extending through said hollow shaft, the outer pipe communicating at its lower end with said upper chamber and communicating at its upper end with said return chamber and said inner pipe communicating at its lower end with said lower chamber and communicating at its upper end with said distributing chamber, a coil within said tank, connections between one end of said coil and said distributing chamber, connections between the other end of said coil and said return chamber, and a jacket surrounding said inner pipe throughout its length arranged to form a dead air space around said pipe.

5. In a liquid treating apparatus, the combination of a tank, one wall thereof being formed with an opening, a tubular member within said tank and stationarily supported at its lower end on said wall, concentric to said opening, a hollow shaft extending through said member and rotatably mounted on its inner wall at its upper end, means connected to the outer end of said shaft for rotating it, a hollow head secured to the inner end of said shaft and rotated thereby, said head comprising related sections forming a distributing chamber and a return chamber, a fitting disposed outwardly of and connected to said wall and comprising inner and outer chambers, inner and outer pipes extending through said hollow shaft, the outer pipe communicating at its outer end with said inner chamber and communicating at its inner end with said return chamber and said inner pipe communicating at its outer end with said outer chamber and communicating at its inner end with said distributing chamber, a coil within said tank, connections between one end of said coil and said distributing chamber, and connections between the other end of said coil and said return chamber.

6. In a liquid treating apparatus, the combination of a tank, one wall thereof being formed with an opening, a tubular member supported on said wall, concentric to said opening, a hollow shaft rotatably mounted in said tubular member, means connected to the outer end of said shaft for rotating it, a hollow head carried by the inner end of said shaft and rotated thereby, said head comprising related sections forming a distributing chamber and a return chamber, a fitting disposed outwardly of and connected to said wall and comprising inner and outer chambers, inner and outer pipes extending through said hollow shaft, the outer pipe communicating at its outer end with said inner chamber and communicating at its inner end with said return chamber and said inner pipe communicating at its outer end with said outer chamber and communicating at its inner end with said distributing chamber, a coil within said tank, connections between one end of said coil and said distributing chamber, connections between the other end of said coil and said return chamber, and a jacket surrounding said inner pipe throughout its length arranged to form a dead air space around said pipe.

7. In a liquid treating apparatus, the combination of a tank formed with an opening in its bottom, a tubular member within said tank and stationarily supported at its lower end on said bottom, concentric to said opening, a hollow shaft extending through said member and rotatably mounted on its inner wall at its upper end, means connected to the lower end of said shaft for rotating it, a hollow head secured to the upper end of said shaft and rotated thereby, said head comprising related sections forming a distributing chamber and a return chamber, inner and outer pipes arranged within said hollow shaft and communicating at their upper ends with said distributing chamber and return chamber, respectively, a pipe having liquid connections with said distributing chamber and depending downwardly from said head exteriorly of said tubular member, and a coil connected at one end to said depending pipe and connected at its other end to said return chamber.

8. In a liquid treating apparatus, the combination of a tank formed with an opening in its bottom, a tubular member supported on said bottom, concentric to said opening, a hollow shaft rotatably mounted in said tubular member, means connected to the lower end of said shaft for rotating it, a hollow head carried by the upper end of said shaft and rotated thereby, said head comprising related sections forming a distributing chamber and a return chamber, inner and outer pipes arranged within said hollow shaft and communicating at their upper ends with said distributing chamber and return chamber, respectively, a pipe having liquid connections with said distributing chamber and depending downwardly from said head exteriorly of said tubular member, and a coil connected at one end to said depending pipe and connected at its other end to said return chamber, said depending pipe being provided with a sleeve spaced from the walls thereof and forming a dead air space throughout a portion of said pipe.

9. In a liquid treating apparatus, the combination of a tank formed with an opening in its bottom, a tubular member supported on said bottom, concentric to said opening, a hollow shaft rotatably mounted in said tubular member, means connected to the lower end of said shaft for rotating it, a hollow head carried by the upper end of said shaft and rotated thereby, said head comprising related sections forming a distributing chamber and a return chamber, inner and outer pipes arranged within said hollow shaft and communicating at their upper ends with said distributing chamber and return chamber, respectively, a pipe having liquid connections with said distributing chamber and depending downwardly from said head exteriorly of said tubular member, and a coil connected at one end to said depending pipe and connected at its other end to said return chamber, said depending pipe being provided with a sleeve spaced from the walls thereof and forming a dead air space throughout a portion of said pipe, the sleeve in each said pipe extending from a point above the level of the liquid in said tank to a point below the level of the liquid.

10. In a liquid treating apparatus, the combination of a tank formed with an opening in its bottom, a tubular member within said tank and stationarily supported at its lower end on said bottom, concentric to said opening, a hollow shaft extending through said member and rotatably mounted on its inner wall at its upper end, means connected to the lower end of said shaft for rotating it, a hollow head secured to the upper end of said shaft and rotated thereby, said head comprising related sections forming a distributing chamber and a return chamber, inner and outer pipes arranged within said hollow shaft and communicating at their upper ends with said distributing chamber and return chamber, respectively, a plurality of pipes having liquid connections with said distributing chamber and depending downwardly from said head exteriorly of said tubular member, a manifold to which the lower ends of said depending pipes are connected, and a coil connected at one end to said manifold and connected at its other end to said return chamber.

11. In a liquid treating apparatus, the combination of a tank formed with an opening in its bottom, a tubular member supported on said bottom, concentric to said opening, a hollow shaft rotatably mounted in said tubular member, means connected to the lower end of said shaft for rotating it, a hollow head carried by the upper end of said shaft and rotated thereby, said head comprising related sections forming a distributing chamber and a return chamber, inner and outer pipes arranged within said hollow shaft and communicating at their upper ends with said distributing chamber and return chamber, respectively, a plurality of pipes having liquid connections with said distributing chamber and depending downwardly from said head exteriorly of said tubular member, a manifold to which the lower ends of said depending pipes are connected, and a coil connected at one end to said manifold and connected at its other end to said return chamber, each of said depending pipes being provided with a sleeve spaced from the walls thereof and forming a dead air space thoroughout a portion of said pipe.

12. In a liquid treating apparatus, the combination of a tank formed with an opening in its bottom, a tubular member supported on said bottom, concentric to said opening, a hollow shaft rotatably mounted in said tubular member, means connected to the lower end of said shaft for rotating it, a hollow head carried by the upper end of said shaft and rotated thereby, said head comprising related sections forming a distributing chamber and a return chamber, inner and outer pipes arranged within said hollow shaft and communicating at their upper ends with said distributing chamber and return chamber, respectively, a plurality of pipes having liquid connections with said distributing chamber and depending downwardly from said head exteriorly of said tubular member, a manifold to which the lower ends of said depending pipes are connected, and a coil connected at one end to said manifold and connected at its other end to said return chamber, each of said depending pipes being provided with a sleeve spaced from the walls thereof and forming a dead air space throughout a portion of said pipe, the sleeve in each said pipe extending from a point above the level of the liquid in said tank to a point below the level of the liquid.

13. In a liquid treating apparatus, the combination of a tank formed with an opening in its bottom, a tubular member supported on said bottom, concentric to said opening, a hollow shaft rotatably mounted in said tubular member, means connected to the lower end of said shaft for rotating it, a hollow head carried by the upper end of said shaft and rotated thereby, said head comprising related sections forming a distributing chamber and a return chamber, inner and outer pipes arranged within said hollow shaft and communicating at their upper ends with said distributing chamber and return chamber, respectively, a plurality of pipes having liquid connections with said distributing chamber and depending downwardly from said head exteriorly of said tubular member, a manifold to which the lower ends of said depending pipes are connected, a coil connected at one end to said manifold and connected at its other end to said return chamber, and means for supporting said coil on said depending pipes.

14. In a liquid treating apparatus, the combination of a tank formed with an opening in its bottom, a tubular member within said tank and stationarily supported at its lower end on said bottom, concentric to said opening, a hollow head carried by the upper end of said member, said head comprising related sections forming a distributing chamber and a return chamber, inner and outer pipes arranged within said member and communicating at their upper ends with said distributing chamber and return chamber, respectively, a plurality of pipes having liquid connections with said distributing chamber and depending downwardly from said head exteriorly of said tubular member, a manifold to which the lower ends of said pipes are connected, and a coil connected at one end to said manifold and connected at its other end to said return chamber.

15. In a liquid treating apparatus, the combination of a tank formed with an opening in its bottom, a tubular member supported on said bottom, concentric to said opening, a hollow head carried by the upper end of said member, said head comprising related sections forming a distributing chamber and a return chamber, inner and outer pipes arranged within said member and communicating at their upper ends with said distributing chamber and return chamber, respectively, a plurality of pipes having liquid connections with said distributing chamber and depending downwardly from said head exteriorly of said tubular member, a manifold to which the lower ends of said pipes are connected, and a coil connected at one end to said manifold and connected at its other end to said return chamber, each of said depending pipes being provided with a sleeve spaced from the walls thereof and forming a dead air space throughout a portion of said pipe.

16. In a liquid treating apparatus, the combination of a tank formed with an opening in its bottom, a tubular member supported on said bottom, concentric to said opening, a hollow head carried by the upper end of said member, said head comprising related sections forming a distributing chamber and a return chamber, inner and outer pipes arranged within said member and communicating at their upper ends with said distributing chamber and return chamber, respectively, a plurality of pipes having liquid connections with said distributing chamber and depending downwardly from said head exteriorly of said tubular member, a manifold to which the lower ends of said pipes are connected, and a coil connected at one end to said manifold and connected at its other end to said return chamber, each of said depending pipes being provided with a sleeve spaced from the walls thereof and forming a dead air space throughout a portion of said pipe, the sleeve in each said pipe extending from a point above the level of the liquid in said tank to a point below the level of the liquid.

17. In a liquid treating apparatus, the combination of a tank formed with an opening in its bottom, a tubular member supported on said bottom, concentric to said opening, a head within said tank and stationarily supported at its lower end by the upper end of said member, a fitting disposed below and connected to said bottom, a pipe connected to said fitting and extending through said member for supplying a heat transfer medium to the interior of said head, a coil in said tank connected at one end to said head to permit flow of the medium into and through said coil, and liquid tight connections connected to the opposite end of said coil and extending through said member for discharging the medium from said coil.

18. In a liquid treating apparatus, the combination of a tank formed with an opening in its bottom, a tubular member within said tank and stationarily supported at its lower end on said bottom, concentric to said opening, a head carried at the upper end of said member, a fitting disposed below and connected to said bottom and having supply and discharge connections for a heat transfer medium, pipes connected respectively to said connections and extending through said member, one of said pipes serving to supply the medium to the interior of said head, a coil connected at one end to said head to permit flow of the medium into and through said coil, and connections between the other end of said coil and said head for discharging the medium into the other pipe.

19. In liquid treating apparatus, the combination of a tank formed with an opening in its bottom, a tubular member within said tank and stationarily supported at its lower end on said bottom, concentric to said opening, a hollow head supported by the upper end of said member, said head comprising related sections forming a distributing chamber and a return chamber, a fitting disposed below and connected to said bottom and comprising upper and lower chambers, inner and outer pipes extending through said member, the outer pipe communicating at its lower end with said upper chamber and communicating at its upper end with said return chamber and said inner pipe communicating at its lower end with said lower chamber and communicating at its upper end with said distributing chamber, a coil within said tank, connections between one end of said coil and said distributing chamber, and connections between the other end of said coil and said return chamber.

20. In liquid treating apparatus, the combination of a tank formed with an opening in its bottom, a tubular member supported on said bottom, concentric to said opening, a hollow head carried by the upper end of said member, said head comprising related sections forming a distributing chamber and a return chamber, a fitting disposed below and connected to said bottom and comprising upper and lower chambers, inner and outer pipes extending through said member, the outer pipe communicating at its lower end with said upper chamber and communicating at its upper end with said return chamber and said inner pipe communicating at its lower end with said lower chamber and communicating at its upper end with said distributing chamber, a coil within said tank, connections between one end of said coil and said distributing chamber, connections between the other end of said coil and said return chamber, and a jacket surrounding said inner pipe throughout its length arranged to form a dead air space around said pipe.

21. In a liquid treating apparatus, the combination of a tank, one wall thereof being formed with an opening, a tubular member within said tank and stationarily supported at one end on said wall, concentric to said opening, a hollow head carried by the inner end of said member, said head comprising related sections forming a distributing chamber and a return chamber, a fitting disposed outwardly of and connected to said wall and comprising inner and outer chambers, inner and outer pipes extending through said member, the outer pipe communicating at its outer end with said inner chamber and communicating at its inner end with said return chamber and said inner pipe communicating at its outer end with said outer chamber and communicating at its inner end with said distributing chamber, a coil within said tank, connections between one end of said coil and said distributing chamber, and connections between the other end of said coil and said return chamber.

22. In a liquid treating apparatus, the combination of a tank, one wall thereof being formed with an opening, a tubular member supported on said wall, concentric to said opening, a hollow head carried by the inner end of said member, said head comprising related sections forming a distributing chamber and a return chamber, a fitting disposed outwardly of and connected to said wall and comprising inner and outer chambers, inner and outer pipes extending through said member, the outer pipe communicating at its outer end with said inner chamber and communicating at its inner end with said return chamber and said inner pipe communicating at its outer end with said outer chamber and communicating at its inner end with said distributing chamber, a coil within said tank, connections between one end of said coil and said distributing chamber, and connections between the other end of said coil and said return chamber, and a jacket surrounding said inner pipe throughout its length arranged to form a dead air space around said pipe.

23. In a liquid treating apparatus, the combination of a tank formed with an opening in its bottom, a tubular member supported on said bottom, concentric to said opening, a hollow head carried by the upper end of said member, said head comprising related sections forming a distributing chamber and a return chamber, inner and outer pipes arranged within said hollow shaft and communicating at their upper ends with said distributing chamber and return chamber, respectively, a pipe having liquid connections with said distributing chamber and depending downwardly from said head exteriorly of said tubular member, and a coil connected at one end to said depending pipe and connected at its other end to said return chamber.

24. In a liquid treating apparatus, the combination of a tank formed with an opening in its bottom, a tubular member supported on said bottom, concentric to said opening, a hollow head carried by the upper end of said member, said head comprising related sections forming a distributing chamber and a return chamber, inner and outer pipes arranged within said member and communicating at their upper ends with said distributing chamber and return chamber, respectively, a pipe having liquid connections with said distributing chamber and depending downwardly from said head exteriorly of said tubular member, and a coil connected at one end to said depending pipe and connected at its other end to said return chamber, said depending pipe being provided with a sleeve spaced from the walls thereof and forming a dead air space throughout a portion of said pipe.

25. In a liquid treating apparatus, the combination of a tank formed with an opening in its bottom, a tubular member supported on said bottom, concentric to said opening, a hollow head carried by the upper end of said member, said head comprising related sections forming a distributing chamber and a return chamber, inner and outer pipes arranged within said member and communicating at their upper ends with said distributing chamber and return chamber, respectively, a pipe having liquid connections with said distributing chamber and depending downwardly from said head exteriorly of said tubular member, and a coil connected at one end to said depending pipe and connected at its other end to said return chamber, said depending pipe being provided with a sleeve spaced from the walls thereof and forming a dead air space throughout a portion of said pipe, said sleeve extending from a point above the level of the liquid in said tank to a point below the level of the liquid.

26. In a liquid treating apparatus, the combination of a tank formed with an opening in its bottom, a tubular member supported on said bottom, concentric to said opening, a hollow head carried by the upper end of said member, said head comprising related sections forming a distributing chamber and a return chamber, inner and outer pipes arranged within said member and communicating at their upper ends with said distributing chamber and return chamber, respectively, a plurality of pipes having liquid connections with said distributing chamber and depending downwardly from said head exteriorly of said tubular member, a coil connected at one end to said depending pipes and connected at its other end to said return chamber, and means for insulating each of said depending pipes throughout a portion of their length.

27. In a liquid treating apparatus, the combination of a tank formed with an opening in its bottom, a tubular member supported on said bottom, concentric to said opening, a hollow head carried by the upper end of said shaft and rotated thereby, said head comprising related sections forming a distributing chamber and a return chamber, inner and outer pipes arranged within said member and communicating at their upper ends with said distributing chamber and return chamber, respectively, means for insulating one of said pipes substantially throughout its length, a pipe having liquid connections with said distributing chamber and depending downwardly from said head exteriorly of said tubular member, and a coil connected at one end to said depending pipe and connected at its other end to said return chamber.

28. In a liquid treating apparatus, the combination of a tank formed with an opening in its bottom, a tubular member within said tank and stationarily supported at its lower end on said bottom, concentric to said opening, a hollow shaft rotatably mounted in said tubular member, means connected to the lower end of said shaft for rotating it, a hollow head carried by the upper end of said shaft and rotated thereby, said head comprising related sections forming a distributing chamber and a return chamber, inner and outer pipes arranged within said hollow shaft and communicating at their upper ends with said distributing chamber and return chamber, respectively, glands between portions of said head and each of said pipes, and a coil having liquid tight connections at one end with said distributing chamber and liquid connections at its other end with said return chamber.

In testimony whereof, I have hereunto subscribed my name.

CLIFFORD MORROW.